G. VON ARCO & A. MEISSNER.
TRANSMITTING APPARATUS FOR WIRELESS TELEGRAPHY AND TELEPHONY.
APPLICATION FILED MAR. 6, 1914.

1,267,018.

Patented May 21, 1918.
7 SHEETS—SHEET 1.

Witnesses:
Emil Forster Jr
Ray J. Ernst

Inventors.
Georg von Arco
Alexander Meissner
by Amy...
Attys.

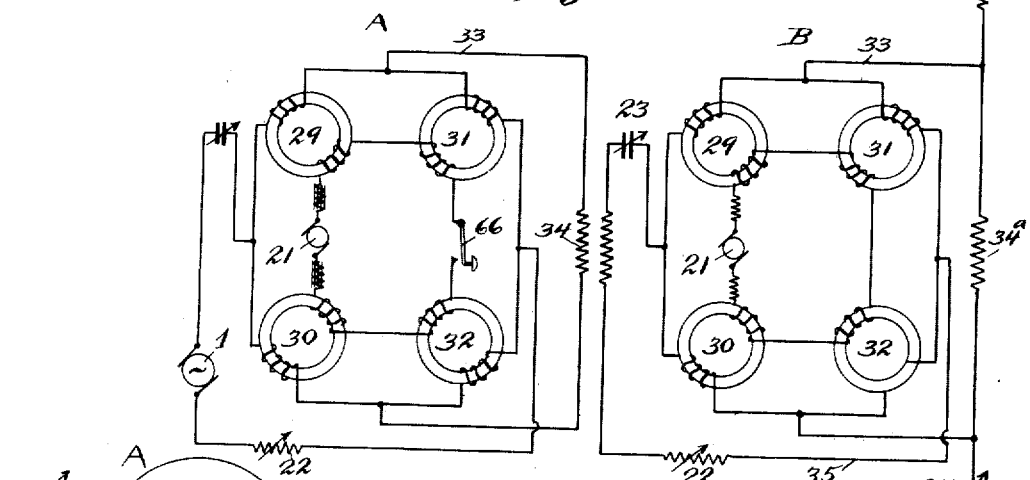
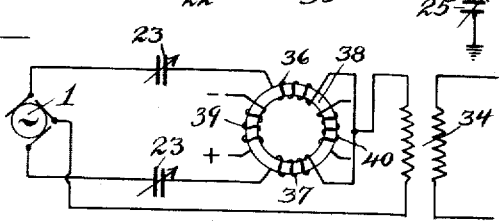
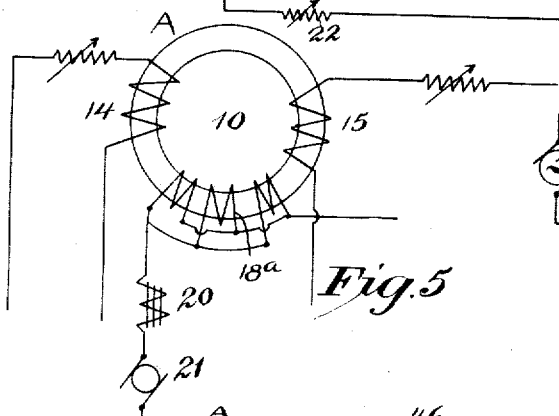
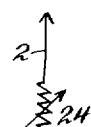
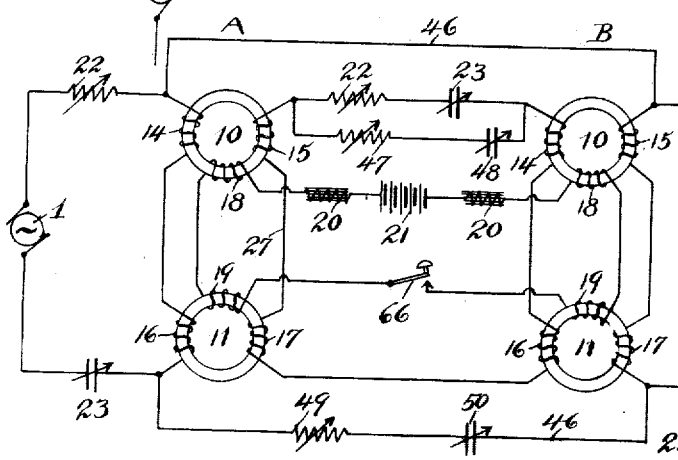

G. VON ARCO & A. MEISSNER.
TRANSMITTING APPARATUS FOR WIRELESS TELEGRAPHY AND TELEPHONY.
APPLICATION FILED MAR. 6, 1914.

1,267,018.

Patented May 21, 1918.
7 SHEETS—SHEET 4.

Inventors:
Georg von Arco and
Alexander Meissner
by Knight Bros.
their Attorneys.

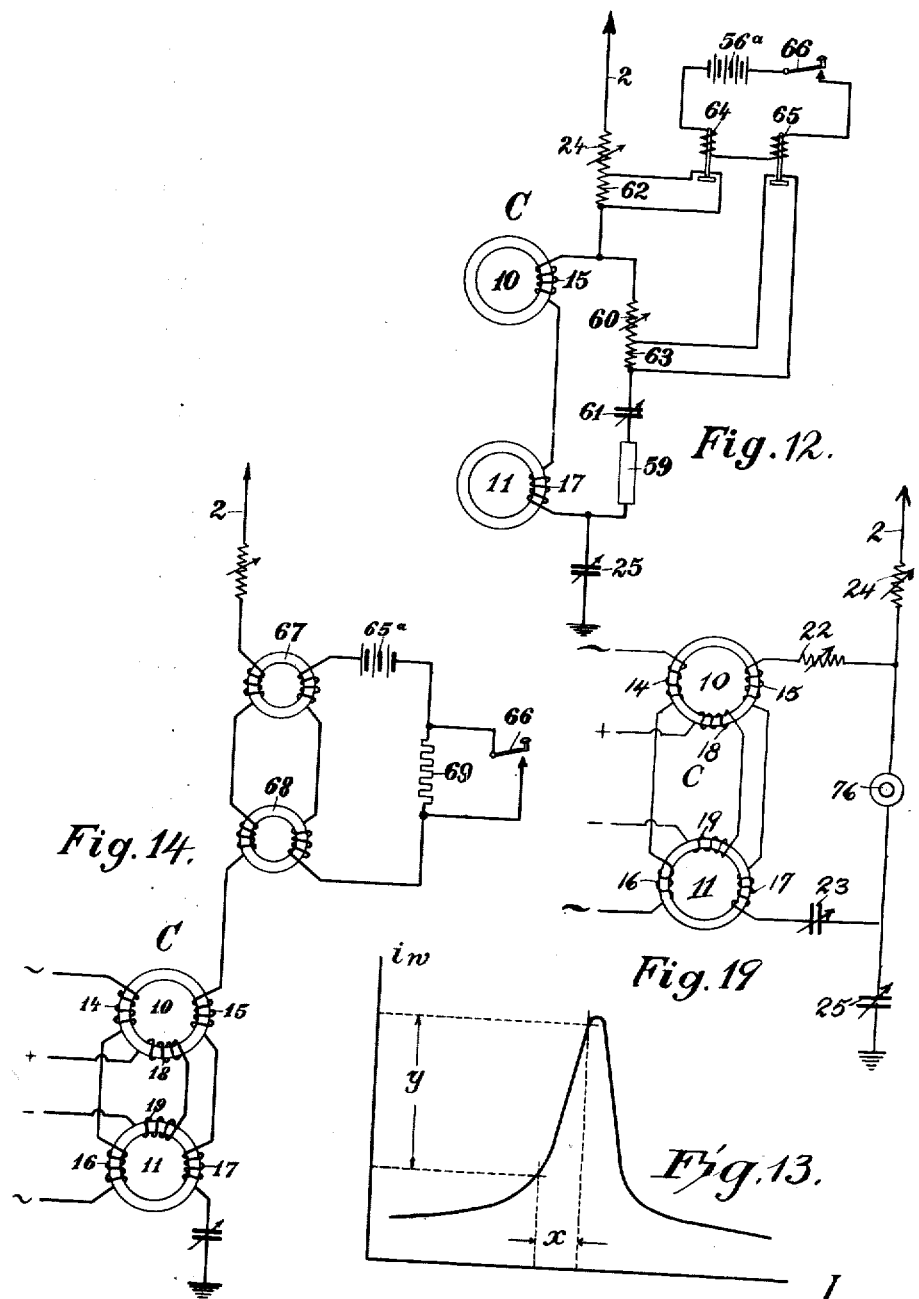

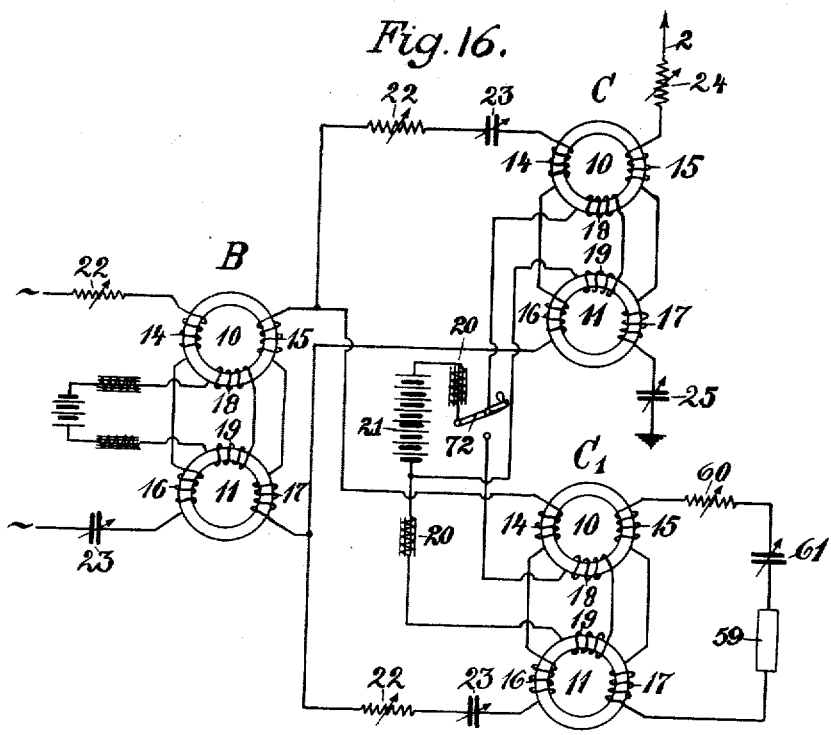
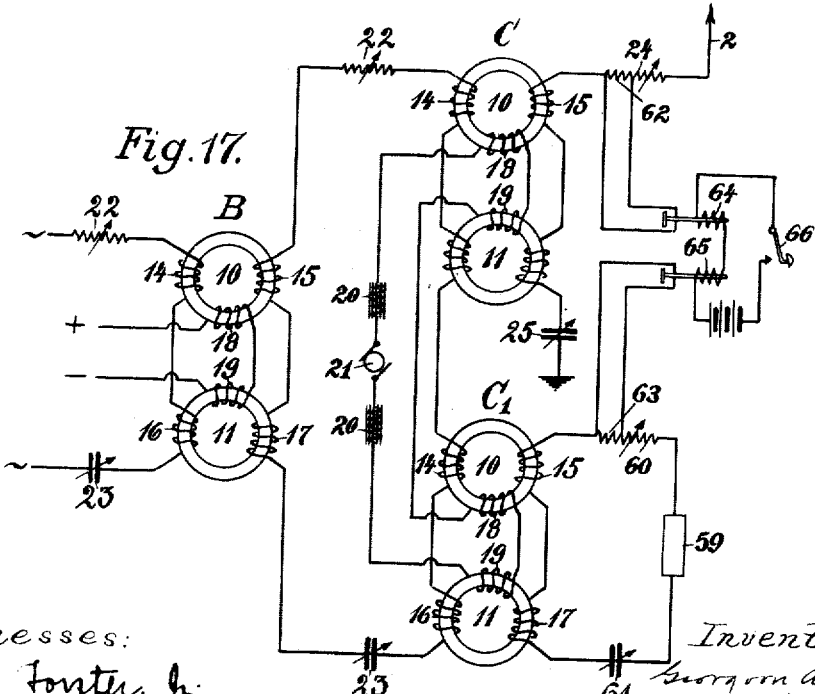

UNITED STATES PATENT OFFICE.

GEORG VON ARCO AND ALEXANDER MEISSNER, OF BERLIN, GERMANY, ASSIGNORS TO GESELLSCHAFT FÜR DRAHTLOSE TELEGRAPHIE M. B. H., OF BERLIN, GERMANY.

TRANSMITTING APPARATUS FOR WIRELESS TELEGRAPHY AND TELEPHONY.

1,267,018. Specification of Letters Patent. Patented May 21, 1918.

Application filed March 6, 1914. Serial No. 822,901.

*To all whom it may concern:*

Be it known that we, GEORG VON ARCO and ALEXANDER MEISSNER, citizens of the German and Austrian Emperors, respectively, and both residing at Berlin, Germany, have invented certain new and useful Improvements in Transmitting Apparatus for Wireless Telegraphy and Telephony, of which the following is a specification.

High frequency oscillations which have been heretofore used in transmitting stations for wireless telegraphy and telephony, have been produced heretofore chiefly by means of sparks or electric arcs. For quite some time attempts have also been made to produce such high frequency oscillations directly in the rotating generators and the advantage was expected to more conveniently and economically generate the necessary large amount of energy for stations having very long ranges. The early experiments in this direction, however, have been unsuccessful, since it has not been possible to produce appreciable amounts of energy in the high frequency generators. So far as recent experimenters have succeeded in constructing high frequency generators yielding appreciable amounts of energy, they have succeeded only with very expensive machines. Besides, such machines constructed heretofore have shown a number of technical disadvantages, the principal of which is that it is possible to vary the wave lengths within wide limits, such as is necessary in most instances in transmitting stations, only by controlling the revolution number of the machine. This results, however, in a very uneconomical operation of the generator. Moreover, great difficulties have been encountered in stations attempting to transmit a large amount of energy in such manner, in controlling the high frequency currents for the purpose of producing signals or speech, because it was necessary to directly influence and interrupt the strong high frequency currents for this purpose.

The object of the present invention is a transmitting station for wireless telegraphy and telephony in which, as has been attempted heretofore, the high frequency currents are produced in a generator which, however, has not the disadvantages aforementioned. According to our invention, an arrangement is used for increasing the frequency of an alternating current in which, by means of stationary transformers having auxiliary magnetizing means, the frequency is doubled or, by using a number of such transformers in cascade arrangement, the frequency is doubled several times. Such transformers, so far as their general principle is concerned, are known in the art. They are termed in the present day radio art as "frequency changers"; which term will be used hereinafter for these apparatus in the specification and claims.

Experiments have proven that it is possible to obtain an increase of frequency amounting to any desired multiple of the fundamental frequency, by means of only one or a few sets of frequency changers similar to the character aforementioned. It is possible, when properly arranging such frequency changers to obtain an economically operating station, if a fundamental frequency is chosen of the order from 5000 to 15000 periods per second, and if for this purpose a high frequency generator is used of a special character. A high frequency machine such as is used in the present invention and which, so far as its use for wireless telegraphy is concerned, still furnishes a current of comparatively low frequency, can be built at considerably smaller cost than a machine which generates a current of such frequencies as are being used in the antenna. In using the means to be described in the present application, all alternating current circuits must be very exactly tuned by means of capacities and inductances, to the required periodicity, in order that the currents may be increased and the losses diminished. If this is done the required high frequencies may be produced at very good efficiency. It is also possible, by properly arranging the sets of changers, to obtain a wide range of wave lengths without necessitating material changes in the revolution number of the generator.

The means by which a station of this character is made economical and by which a large variation of wave lengths becomes possible, have been described in our application Serial Number 738,864, filed December 27, 1912. In the present application, new means are described and claimed which permit the control of the radiated energy for the purpose of producing signals and transmitting speech. These means are closely related to the use of frequency changers, to which reference is made in aforesaid application. The control of the high frequency currents is obtained by means for controlling the auxiliary magnetizing current of these changers, and thus renders possible the control of any desired large amounts of energy in the simplest and easiest manner.

Our invention is illustrated in the accompanying drawings and the principal novel features are more fully pointed out in the annexed claims.

In the accompanying drawings,—

Figure 1 shows an arrangement for increasing the frequency in three steps;

Figs. 2 and 2ª show a longitudinal vertical section and an end view respectively of the stator and rotor of a particular type of high frequency generator.

Fig. 5 shows a modified arrangement of the auxiliary magnetizing of the frequency changers;

Fig. 6 shows a modified arrangement of the frequency changers in the form of Wheatstone's bridge;

Fig. 7 shows an arrangement similar in principal to that of Fig. 6, but having a conductor 33 connected with the armature winding of the generator;

Fig. 8 shows an arrangement in which in a modification such as shown in Fig. 1, the increase in frequency is obtained by superimposing the current from the secondary coils of a subsequent step upon the coils of a preceding step;

Fig. 12 shows means for employing an auxiliary load circuit for the purpose of maintaining the generator load uniform during signaling;

Fig. 13 shows a resonance curve;

Fig. 14 shows an arrangement for de-tuning an antenna by means of frequency changers for the purpose of producing signals;

Fig. 16 shows an arrangement in which the last step of the frequency changers is obtained by two sets of frequency changers in parallel with each other, both sets being alternately energizable by the auxiliary magnetizing current, for the purpose of producing signals;

Fig. 17 shows an arrangement in which the double set of frequency changers shown in Fig. 16 and forming the last step, is arranged in series with the changers of the preceding set;

Fig. 19 shows an arrangement in which a microphone is located in the secondary circuit of the last frequency changer set.

Figure 1:
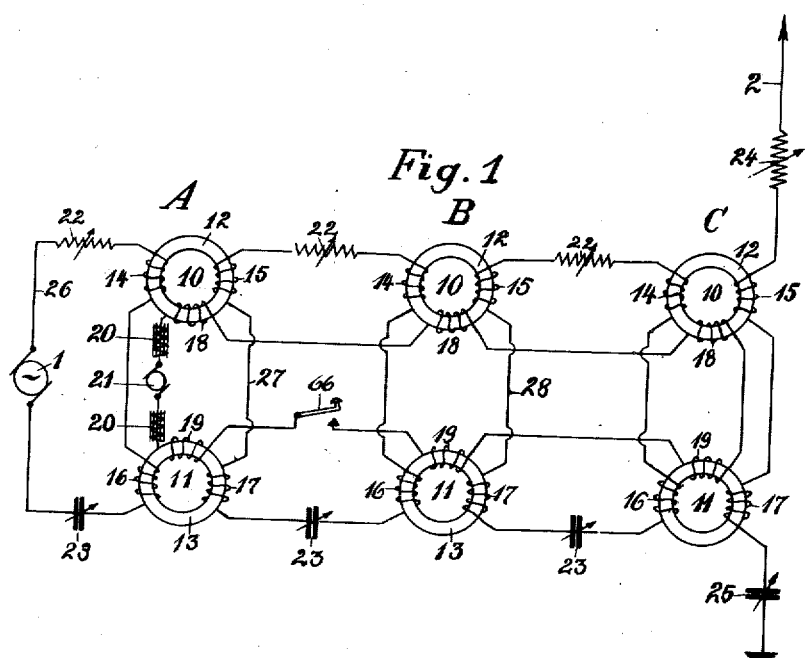

Referring now to Fig. 1, it is assumed that the frequency of the current generated in the alternating current generator 1 is increased in three steps, A, B, C, before it is supplied to the antenna 2.

Figures 2, 2A, 3:
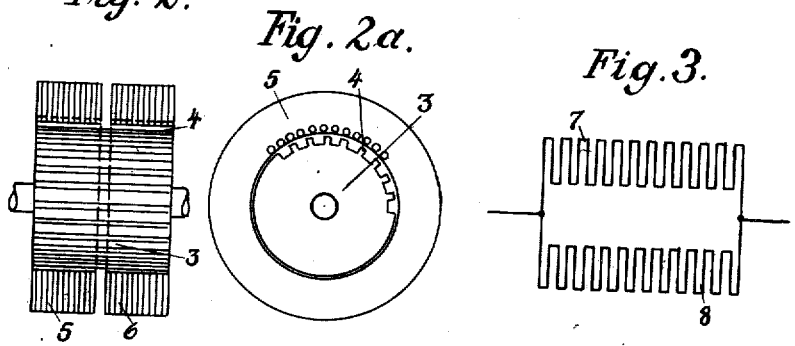
Figs. 3 and 4 show wiring diagrams used in said generator.

The dynamo 1 is a high frequency generator. After many experiments we have found that a type of generator having an air gap, the longitudinal axis of which has the direction of the axis of the rotor, furnishes the best results. Owing to this construction, it is possible to make the air gap very small, which is of great importance on account of the large number of poles and which has also the advantage of increasing the output of the machine. The rotor is indicated at 3 in Figs. 2 and 2ª, and consists of a toothed wheel without winding, and it is driven at a very high speed. The poles which are formed by the aforementioned teeth are all of equal polarity and the generation of high frequency energy is obtained by an undulation of the magnetic flux, but not by a reversion thereof, as is the case in ordinary alternating current generators.

Figure 4:
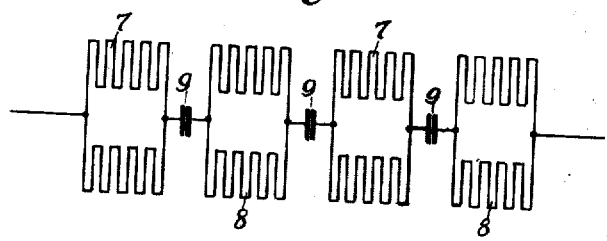

It is of particular advantage to symmetrically divide this generator in the middle at right angles to the rotor axis, so that two equal stator halves 5 and 6 are obtained. The continuous wave windings of the two winding halves 7 and 8 (Fig. 3) are best arranged in parallel, so as to maintain the generator self-induction, and thus the generator tension which may be produced by resonance within the winding at a low value. This precaution is all the more necessary, since in high frequency generators on account of the large number of poles, the insulation of the armature winding is rendered more difficult. In order to further reduce the difficulties caused by undue voltage and by insufficient insulation, each stator half in case of generators with large energy output, is divided into an equal number of sections and two corresponding sections of the two armature halves are in each case arranged in parallel as a group, as shown in Fig. 4. The groups thus formed are arranged in series preferably with a condenser 9 placed between each group. This arrangement reduces materially the equalizing currents which occur in the parallel arrangement of the armature halves, due to the unequalities in winding; moreover, the maximum tension between the entire winding and the stator is not larger than the tension of an individual partial winding and the stator.

It is also advisable in case of a large energy output to provide means for conducting cooling water through the iron of the stator, because the usually employed air cooling produces an undesirable air friction on account of the high speed.

The high frequency generator thus described has been claimed and described in a copending application divided from the present one, Serial Number 156,895.

The frequency changers A, B, C, (Fig. 1) which are arranged between the aforementioned high frequency generator 1 and the antenna 2 consists of one or several mono-inductive resistances 10 and 11. Each resistance comprises an annular or rectangular closed iron yoke 12, 13, (in the drawings an annular yoke is shown) which is composed of thin insulated sheets of iron, whereby each sheet has the complete form of the yoke without a seam. The thickness of the sheet metal decreases with the increased periodicity. This iron yoke carries the windings 14—15, and 16—17 respectively, which in turn carry the high frequency currents. Also windings 18 and 19 are provided which carry a direct current which serves as an auxiliary magnetizing current, and by which the iron is practically saturated. Mono-inductive resistances of this character are already known in the art, and reference has also been made to them in our co-pending applications, Serial Number 738,863, filed December 27th, 1912, and Serial Number 762,359, filed April 19th, 1913, both applications referring to the producing of high frequency energy directly from generators.

Such variation of flux in the iron by the alternating current also produces high frequency tensions in the auxiliary magnetizing windings 18 and 19, which however are prevented from flowing through the direct current sources 21 by means of choking coils 20. These latter coils are preferably placed on an iron core open at both ends, so that the core cannot be saturated by the direct current, and so that these coils are thus prevented from likewise acting as mono-inductive resistances. In order to maintain the voltage in windings 18 and 19 at as low a range as possible, it is of advantage, particularly in case of a large output of energy, to divide the windings of these coils into groups and to arrange these groups in parallel. This is shown in Fig. 5 for the mono-inductive resistance $A^{10}$. Its winding $18^a$ consists of three groups. In such cases, it is best to use a low voltage generator at 21 which furnishes the current for the auxiliary magnetizing windings. If several frequency changers are arranged in series, a direct current generator 21, common to all changers may be used (Fig. 1) or, each set of changers may have its own generator. The latter arrangement is not shown, but obvious to any one skilled in the art, so that illustration thereof has been omitted.

The efficiency of a mono-inductive alternating current resistance described above is the higher, the smaller the magnetic stray flux, and the smaller the losses are in the iron and in the copper. These losses must be carefully taken into consideration in shaping the yoke, as also in uniformly distributing all of the windings over the whole length of the yoke. In case of large energy it is of advantage to build up the closed iron yokes of individual insulated packs of sheet metal, between which air spaces are left. Also it is of advantage to arrange the windings so that also between these windings and the individual layers ample air space is provided. The entire apparatus is best submerged in oil which then may pass between the windings and the packs of sheet metal. Transformers of this character have been described in the U. S. Patent to Paul F. Pichon and Alexander Meissner, No. 1,169,676, dated Jan. 25, 1916.

The best action, and thus, the best frequency transformation is obtained with these apparatuses, if the effective number of ampere turns of the high frequency current winding is approximately equal to the number of ampere turns of the direct current windings; the former should not exceed the latter by more than 20 per cent.

The manner in which these mono-inductive resistances are arranged for the purpose of frequency transformation, may vary according to the manner of energy transmission from one to the other transformer circuit. If, for instance, the frequency changers set is provided with two alternating current windings (Fig. 1) a primary 14 and 16 and a secondary 15 and 17, the energy is transmitted from the primary to the secondary winding by means of the one-sided de-magnetization of iron. In this case, double the frequency is produced in the secondary circuit if the primary and secondary phases are properly connected in such mono-inductive resistances 10 and 11, as has been shown for instance in the drawings, (Fig. 1), for the three steps A, B, C. If, for instance, in this case, the primary windings 14 and 16 of a changer set magnetize the two yokes 12 and 13 in one and the same direction, whereas the auxiliary magnetizing windings 18 and 19 magnetize these two yokes 12 and 13 in the opposite direction, the secondary windings 15 and 17 must be arranged in series, but in the opposite sense. In this case, also the primary windings 14 and 16 may be arranged in parallel with each other and in this way be connected to the high frequency machine.

The elements 22, 24, 23, 25, represent self-induction coils and condensers, which serve for tuning the individual oscillation circuits 26, 27, 28, and the antenna 2 to the frequencies produced in these circuits, in order to increase the efficiency of the whole arrangement.

It is also possible to arrange the mono-inductive resistances in the fashion of the well-known valve arrangements by placing for instance four symmetrically disposed resistances of this character as shown at 29, 30, 31, 32 in Fig. 5, into the four branches of a Wheatstone bridge. Into the middle branch 33 of the bridge is inserted the primary of the transformer 34, and thereby the energy transferred to the circuit 35 which is tuned to double the frequency. Instead of an ordinary transformer 34, also one of the well-known auto-transformers, with or without iron, may be used. This is such an obvious expedient known to every one skilled in this art, that illustration thereof has been omitted in the present application. Circuit 35 may be followed by a further similar frequency increasing set, or also this circuit may be directly connected to the antenna 2 as shown in Fig. 5. Two of these mono-inductive resistances as described heretofore, which have the well-known action, may also be substituted by an induction coil from the middle of which the middle conductor is branched off. Fig. 7 shows an arrangement similar to the one aforementioned in which the middle conductor 33 is connected to the middle of the armature winding of generator 1. In this case, the two remaining mono-inductive resistances or rather their windings 36, 37, are arranged on one yoke 38 which also carries the two direct current windings 39, 40.

Aside from the arrangements heretofore described, further modifications of the circuit arrangement of the mono-inductive resistances, for the purpose of increase in frequency, are possible. These arrangements have been already described and claimed in the above mentioned application Serial Number 738,864. These modifications consist in arranging one or several of these resistances with their high frequency windings in an oscillation circuit, so that a distortion of the current curve of the alternating current flowing in the circuit occurs, and from this circuit any desired, higher frequencies may be, so to say, filtered out.

A further increase in frequency in several steps with only few sets is possible by using each set more than once for increasing the frequency. How this is done has been already described and claimed in our co-pending application, Serial Number 738,864. Another way of obtaining this result is by connecting in several cascade arranged sets the secondary coils of a subsequent set with the primary coils of a preceding set. This arrangement is shown in Fig. 8 on the basis of an arrangement of the mono-inductive resistances according to Fig. 1, whereby however, only two sets A and B are used. The secondary windings 15 and 17 of set B are connected by means of conductors 46 with the primary windings 14, 16 of set A. Therefore, after the frequency of generator 1 has first been doubled by set A and four times the fundamental frequency has been obtained by set B, such resulting frequency is again doubled by set A, so that it now amounts to eight times the fundamental frequency, and from the secondary windings of this set A the currents are led again into set B, so that they are eventually supplied to the antenna 2 from the latter set at sixteen times the fundamental frequency.

Inasmuch as in this modification, circuit 27 leads currents of different frequencies, it is necessary to tune this circuit to these different frequencies. The tuning means 22, 23 serve for tuning to double the frequency, whereas the tuning means 47, 48 arranged in parallel to the former tuning means, serve for tuning to eight times the frequency. Circuit 46 is tuned by inductance 49 and capacity 50.

In order to adjust the radiated energy in the transmitting station to any desired frequency, only a few, at most three sets are used according to the present invention, each set consisting of one or several mono-inductive alternating current resistances, and switching means are used in connection therewith which permit the combination of these alternating current resistances into frequency increasing sets according to one of the many modifications described hereinbefore. These sets may be connected with the generator, and also with each other, and with the antenna in any manner desired such that an increase in machine frequency takes place either in a number of sets corresponding with the number of steps or, it may also take place in a number of sets less than the number of steps. This arrangement is likewise described and claimed in the aforementioned application, Serial Number 738,864.

One of the most essential requirements in a station such as is concerned here, is that, as has been already pointed out, all circuits carrying high frequency currents should be tuned to the particular frequencies which they carry. For this reason all circuits are provided with tuning means such as capacities and inductances. For instance, in each of the circuits located between generator 1 and the several frequency changer sets a variable inductance 22 and a variable condenser 23 is arranged. The antenna has the tuning means 24, 25. If the intermediate conductors between the sets carry several different frequencies (according to Fig. 8) corresponding shunts with further tuning means 47, 48 are provided and the return circuits 46 are also provided with tuning means 49, 50.

Figure 9:
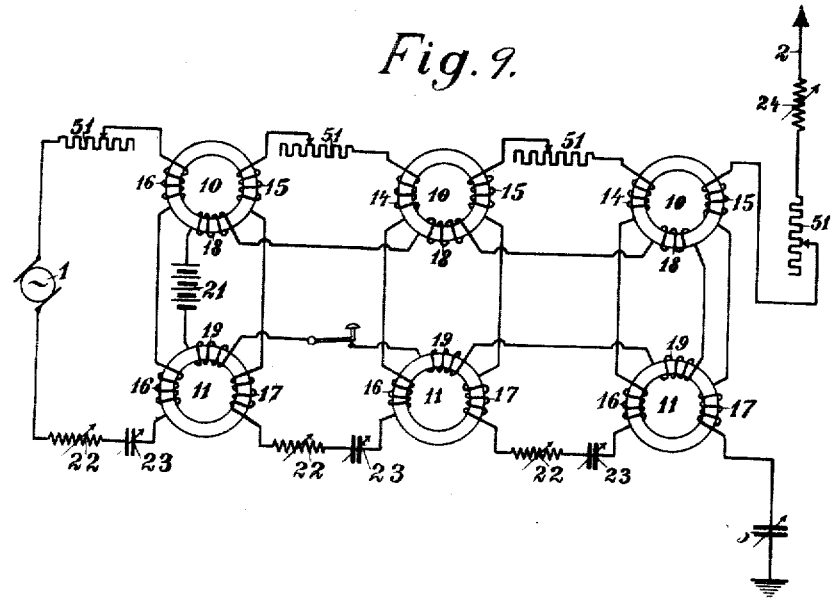
Fig. 9 shows how variable ohmic resistances may be placed into several frequency step-up circuits to facilitate tuning.

It has now been proven by practical experience that it is very tedious and that it requires great skill to tune these several circuits to the impressed frequency by these tuning means. The reason for this is, first—that the range of resonance is very small, and second—that all circuits are tightly coupled by closed core transformers or choking coils, and that for this reason disturbing effects are transmitted from one circuit to the other, which are the more noticeable the farther these circuits are away from true resonance. In order to facilitate the tuning it is advisable to arrange adjustable ohmic resistances 51 (Fig. 9) in the several circuits and also in the antenna, which at the beginning of the tuning are thrown into circuit at their full value and which, as the circuits approach resonance, are gradually thrown out. Therefore, so long as by the full effect of these resistances the damping of the circuits has been sufficiently increased, it is comparatively easy to tune these circuits roughly and to gradually obtain the sharper tuning as these resistances are decreased.

Figure 10:
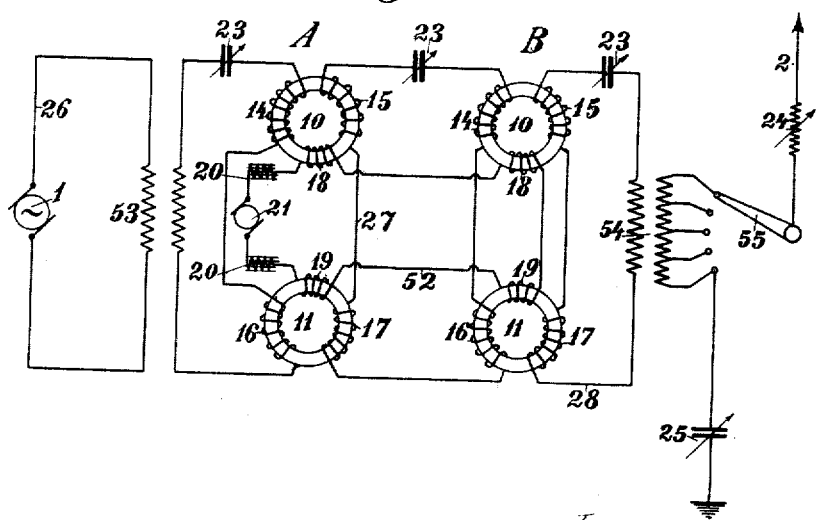
Fig. 10 shows an arrangement having highly damped intermediate step-up circuits to avoid close tuning of the intermediate circuits.

Sharply tuned circuits in arrangements for increasing the frequency have the disadvantage that each variation in frequency caused by the varying revolution number of the generator necessitates a new tuning of the circuits, which is, of course, time consuming and very tedious. On the other hand, in practice it is highly desirable that the wave length be changed very quickly. Such variation of wave lengths may be obtained according to the present invention by rendering the entire arrangement independent of the tuning of the intermediate circuits. It is necessary for this purpose to make the damping of the intermediate circuits very large, so that they are almost aperiodic. Fig. 10 shows such an arrangement.

A and B are again the two frequency changer sets which are connected through the intermediate circuit 27 and the auxiliary magnetizing circuit 52. The generator current is supplied to the first set A by means of transformer 53. Also the antenna 2 is connected with the last set B by means of a transformer 54. The damping of circuits 26, 27, 28 is chosen so that these circuits are almost aperiodic. This effect is obtained by using a large number of turns on the frequency changer coils, which in such case then transform like ordinary transformers as to voltage, so that they carry the energy to be transformed at high potential and at small current. The conductive resistance affecting the damping to a certain degree is also chosen comparatively large. If besides, the capacity is very large compared with the total self-induction of the several oscillation circuits, the latter are very highly damped. Consequently it is possible to vary the oscillation of the currents which are transformed by these circuits within wide limits, without materially disturbing the energy transmission. In order to reduce the effect of the self-induction of the windings on the mono-inductive resistances a capacity, a self-inductance or a resistance may be thrown in parallel thereto in well-known manner. This is likewise not shown in the drawings, but will be clear to any one skilled in the art.

The use of transformer 53 has the advantage to also render aperiodic the circuit which contains the high frequency generator. The transformer 54 serves the purpose of re-transforming the energy received from set B into suitable values of current and tension desired in the antenna. For this purpose the ratio of the transformer may be varied by means of a switch 55. It is possible to use the frequency charger B for this purpose instead of the ordinary transformer, if only the secondary windings 15, 17 are made variable in a similar way.

The detail features of the arrangement just described which control the mono-inductive resistances for the purpose of increasing the frequency, are not claimed here, but are described and claimed in a copending application divided from the present one, Serial Number 156,894.

It has been already mentioned at the beginning that in transmitting stations in which large amounts of energy are radiated, it is generally quite difficult to affect a high frequency energy in such manner that the desired signals are produced, but that according to the transmitting station herein described, this problem can be solved very easily and in a very simple manner. The means which are uesd for this control are the key for producing Morse alphabet signals, further means for producing a musical tone in the receiving apparatus and lastly means by which a transmission of speech is effected. According to the present invention, the control for the transmission of these different kinds of signals is obtained essentially by varying the tuning of the high frequency circuits, especially that of the antenna.

Figure 11:
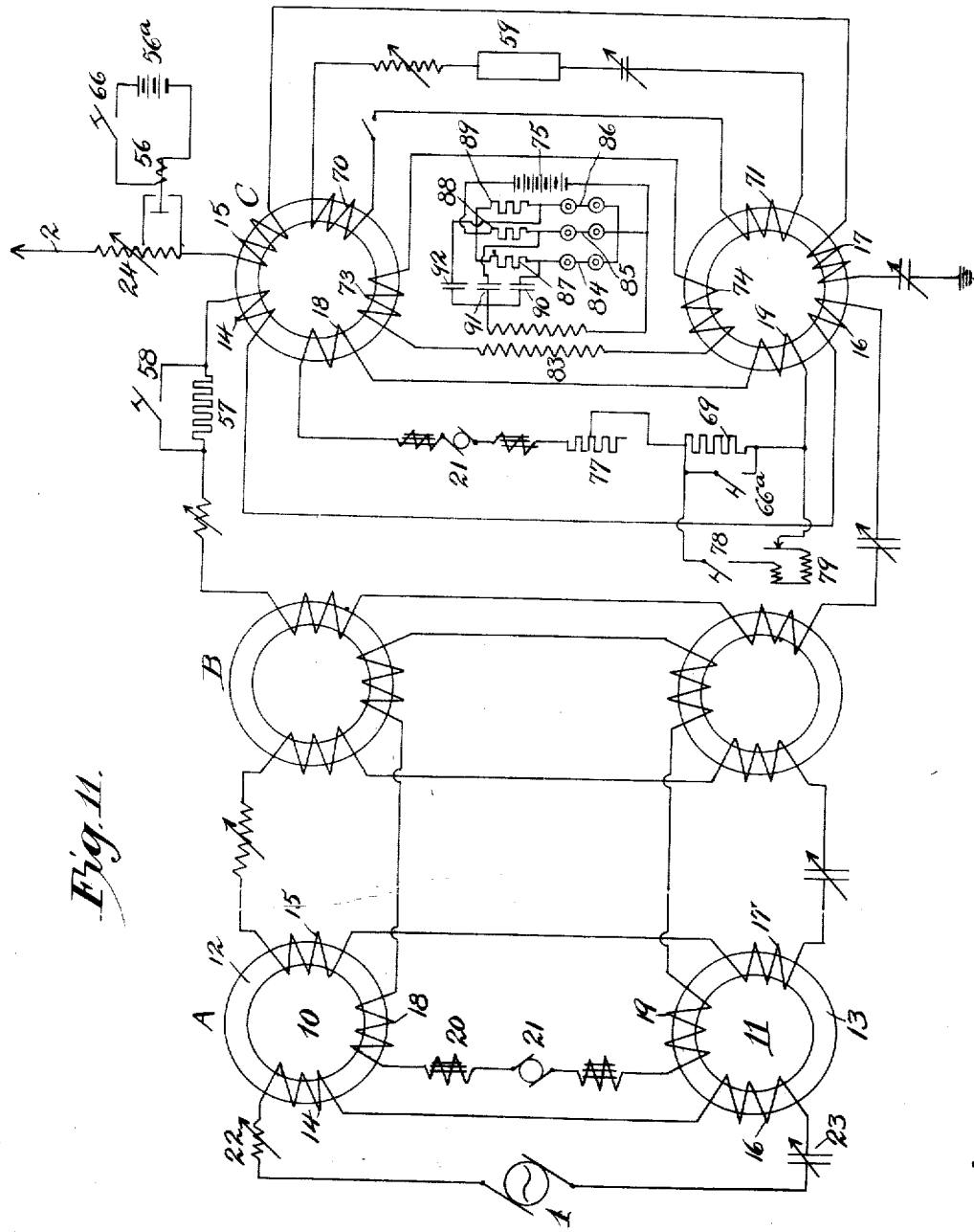
Fig. 11 shows a complete assembled station containing the novel features shown in detail in the other figures.

The variation of the antenna tuning for the purpose of producing signals may be easily obtained according to the present invention, for instance as shown in Fig. 11, where by means of a key operated relay 56 a portion of the self-induction 24 of the antenna is short circuited. It is old in itself to produce Morse code signals by variation in tuning. This method has been employed in a number of systems using the arc or sparks for producing high frequency oscillations. Still in these latter arrangements always a different wave is radiated during the intervals between the signals. In the present case, on the other hand, this does not take place, but as soon as the antenna or another of the high frequency circuits is out of resonance with the frequency produced by the frequency changers, the generator is unloaded and no radiation takes place at all. Of course, it is obvious that instead of a key an interrupter for producing a musical tone or a microphone might be used for influencing the antenna. This modification is not shown inasmuch as the effect and manner of operation is almost exactly the same as that employing a key. The microphone as well as a vibrating or rotating interrupter for producing musical tones has the same effect upon the circuit controlling relay 56.

By thus de-tuning the antenna by means of the above described key, a phase shifting between tension and current is produced in the high frequency circuits which does not exist while the antenna is tuned. It has been found that through such phase shifting and with the arrangement of the frequency changes described before, it may happen that the current suddenly increases and that undue rises in potential occur in the high frequency generator as a consequence. To avoid this it is advisable to place a resistance 57 into one of the preceding high frequency circuits which is shunted by a short circuit key 58. The Morse signals are then produced by means of the key in such manner that at the moment the signal is produced the antenna is tuned and the resistance 57 is short circuited, whereas when the signal stops and the key is lifted the resistance is thrown in and then the antenna de-tuned.

In the arrangement of thus controlling the radiated energy described before, the machine is unloaded at each untuning of the antenna. In case large amounts of energy are radiated such unloading of the generator has great disadvantages, in particular when the Morse alphabet is being used for signaling where comparatively long pauses during the transmission occur, which causes a considerable variation in revolution number of the generator. In order to avoid this, advantage is being taken in the present invention of in itself well-known means according to which the generator is loaded during intervals between the signals by a non-radiating circuit by which during such intervals the generator is loaded the same as during the radiation of signals.

However, in known devices of this character, it is necessary to interrupt the antenna circuit or the auxiliary loading circuit each time the generator is thrown onto one or the other circuit. Particularly in case of large amounts of energy such as is being used in a station as applicants have in mind here, such interruption is not feasible. However, the principle on which this entire invention is based permits of a much simpler energy control. In the present case the arrangement is made so that the auxiliary loading circuit as well as the antenna remains permanently connected with the source of high frequency energy and the transfer of energy from the antenna circuit to the auxiliary loading circuit, and vice versa, is obtained simply by a variation of the tuning of the two circuits.

A manner in which this may be carried out is shown in Fig. 12. The secondary windings 15, 17 of the last set C of a system of frequency changers are connected as well with the antenna 2 as also with a loading circuit containing the ballast 59 and the tuning means 60, 61. The self-inductions 24, 60 respectively of the two circuits each have a portion 62 and 63 connected respectively with a short circuit relay 64 and 65 by means of which they may be thrown into and out of circuit. It is assumed in this case that when they are short circuited the antenna is tuned, and when their short circuit is interrupted the loading circuit is tuned. The closing of the short circuit relays 64, 65 is obtained by an auxiliary circuit containing the battery 56ª and key 66.

However, the means for de-tuning the antenna such as have been described heretofore still have the disadvantage that circuits are interrupted which carry high frequency currents. This may be avoided if mono-inductive resistances are used for de-tuning. These resistances may be in principle of the same character as those used for the frequency changers. It is possible to influence the high frequency currents by varying the auxiliary magnetizing current of these mono-inductive resistances, so that no more interruptions occur in the high frequency circuit. At the same time the use of such resistances has the further advantage that at comparatively small variations of the magnetizing current great variations of the current in the alternating current coils are obtained. This feature has already been mentioned in our aforesaid U. S. Patent No. 1,181,556, dated May 2nd, 1916. This feature may be explained from the following contemplation. If for instance, the alternating current $i_w$ in the alternating current winding of such a resistance is plotted graphically in dependence upon the self-induction of these coils, a resonance curve is obtained of the character shown in Fig. 13

13. Now the self-induction of these alternating current coils is also dependent upon the characteristic of the iron core, in particular upon the intensity of the flux, and therefore by varying the auxiliary magnetizing current also the variation of the self-induction of the alternating current coil is obtained which in turn results in variation of the current intensity. If now, the electrical values such as resistance, self-induction and capacity used in the circuits in which these alternating current coils are located are suitably dimensioned, the effect may be obtained that at a small variation of the magnetizing current which may correspond with a variation of self-induction of the value $x$ (Fig. 13) a large variation of the alternating current, say of the value of $y$ (Fig. 13) is obtained. This relay-like relation of the currents is used for influencing the radiated energy in such manner that by a small variation of the energy in the auxiliary magnetizing circuits a strong de-tuning of the high frequency circuits is caused.

If it is, for instance, desired to produce signals by directly influencing (de-tuning) the antenna, the controlling mono-inductive resistances are placed directly into the antenna circuit, as is shown for instance in Fig. 14. In this figure it will be seen that two of such resistances 67, 68 are placed in series into the circuit in which the antenna 2 is located, whereby the high frequency energy is supplied to the antenna from the last set C of the frequency changers, the other sets being omitted in the drawings. The direct current circuit of these resistances contains an auxiliary source of current 65ª and a resistance 69 which can be short circuited by key 66. The resistance is dimensioned so that when it is not short circuited (when the key 66 is open) the direct current is weakened to such an extent that the antenna is de-tuned thereby, in other words, the current flowing in the antenna is diminished the value $y$ (Fig. 13). Of course instead of key 66 a microphone may be used in case it is desired to transmit speech, or also an interrupter may be substituted in case musical tones should be produced. The latter two modifications are not shown in this figure, since they are obvious to any one skilled in the art, and since they are clearly shown in our U. S. Patent 1,181,556, referred to hereinbefore.

In the modification described in Fig. 14, it is possible to also get along with only one mono-inductive resistance 67, but it has the disadvantage of disturbing in certain instances the production of signals. The reason for this is that in such a resistance coil, as explained hereinbefore, the inductive resistance in one-half period of the alternating current is different from that in the other half of the period. Now if two such devices as 67 and 68 having their alternating current coils wound in the same sense are thrown in series, as shown in Fig. 14, the total resistance of the two half periods is equal, so that for instance if, as pointed out above, a microphone should be used instead of key 66, both halves of the alternating current period are influenced uniformly.

Figure 15:
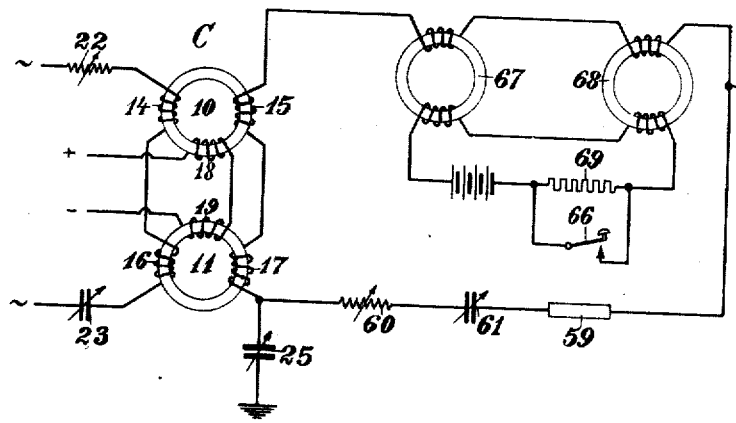
Fig. 15 shows an arrangement in which in case of an auxiliary loading circuit according to Fig. 12, frequency changers are used for de-tuning the antenna when signaling without interrupting the circuit.

In case an auxiliary loading circuit, such as is referred to and shown in Fig. 12, is connected with the transmitting station, the two mono-inductive resistances may be used for alternately tuning and de-tuning the antenna and the loading circuit respectively. Such modification is shown in Fig. 15. The high frequency windings of the resistances 67, 68 are in circuit with the auxiliary load 59; thus if the key 66 is open this circuit is tuned and the antenna de-tuned, whereas when the key 66 is closed the antenna 2 is tuned over the coils 67, 68 and the secondary coils 15, 17 of the last changer set C, and the auxiliary loading circuit is de-tuned.

A particularly effective arrangement is obtained if, for tuning and de-tuning of the antenna and the loading circuit the auxiliary magnetizing of the frequency changer set itself is used. As shown in Fig. 11, for this purpose, the yokes 12, 13 of the last set C aside from carrying the secondary windings 15, 17, which are connected with the antenna 2, also carry further secondary windings 70, 71, which are in circuit with the auxiliary loading circuit containing load 59. Now, by varying the current intensity in the magnetizing circuit, for instance by means of operating key 66ª which is arranged in a manner similar to that shown in Figs. 14 and 15, the antenna may be automatically tuned for instance when the key is closed and the auxiliary loading circuit may be tuned and the antenna de-tuned when the key is open. However, this arrangement has the disadvantage that through the variation of the direct current intensity the energy transmission of this changer set is varied so that it would be difficult to maintain the energy constant to the desired degree of resonance. Still this can be obtained by changing the arrangement into the form shown in Fig. 16. In this figure, the second last changer set B is connected at its secondary windings 15, 17 with two changer sets C, $C_1$, which form the last step of the frequency increase and which are both connected in parallel to set B. Of these two sets C and $C_1$, the former discharges its energy into the antenna 2, whereas the latter $C_1$, is connected with the non-radiating loading circuit containing the load 59. If now, both of these changer sets C and $C_1$ are uniformly dimensioned the load of the generator and that of the changer sets preceding C and $C_1$ remains constant if one or the other of the two parallel sets is thrown into operation. The sets are alternately operated for instance by changing the auxiliary magnetizing current over to one or the other set, for instance by means of a switch 72 which may be formed as a key with two contacts as shown. Of course, instead of this key a relay such as is shown in Fig. 12, operated by an auxiliary circuit and an ordinary key, may be used. This latter modification being obvious is not illustrated. Also in this case, it is sufficient to only weaken the direct current as shown in Fig. 15, if this takes place alternately for the sets C and $C_1$.

However, the parallel arrangement of these two sets has the disadvantage that when the circuits into which these sets discharge their energy are de-tuned, as described their primary current rises to a considerable amount which, in some cases, may affect the entire station to a disadvantage. In order to overcome this, it is advisable to arrange both sets C and $C_a$ in series connection with the preceding set B, as shown in Fig. 17. In this case the detuning brought about by means of relays 64, 65 in a manner already described; or also instead of these relays separate mono-inductive resistances, such as shown and described with reference to Figs. 14 and 15, may be used in the antenna and in the auxiliary loading circuit respectively.

Figure 18:
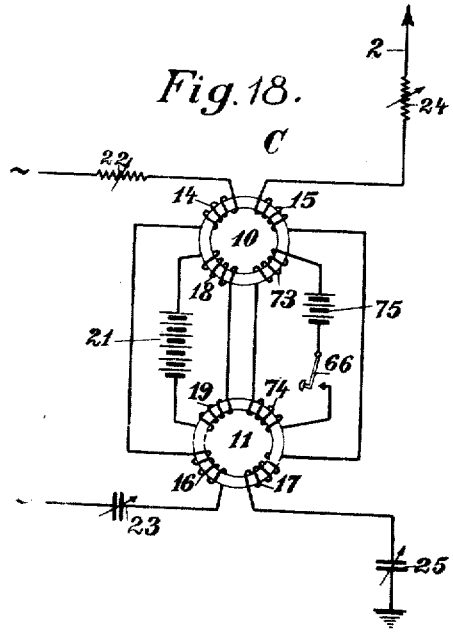
Fig. 18 shows an arrangement in which the auxiliary magnetizing circuit is subdivided into several circuits, one of which contains the means for producing signals.

It has been found of great advantage to divide the auxiliary magnetizing circuit such that by one of these separate windings a constant auxiliary magnetizing is obtained, for instance to such a degree that the necessary magnetic saturation of the iron occurs, whereas by the other auxiliary winding the de-tuning of the tuner circuits is controlled. Such arrangement is shown in Fig. 18. In this case, the two mono-inductive resistances comprising for instance the last changes set C, each have two direct current windings 18, 19 and 73, 74, respectively, aside from their primary and secondary windings 14, 16 and 15, 17 respectively. The two windings 18, 19 are supplied with direct current from the source 21, such that the current magnetizes the iron approximately to such a degree that the oscillation circuit (antenna 2) connected with the secondary coils 15, 17 is not quite in resonance. The complete resonance is only obtained when the iron is further magnetized by the additional energizing of coils 73, 74. These latter coils are supplied from a separate source of direct current 75 and in circuit therewith the key 66 is located. By operating this key the tuning and de-tuning of the antenna in accordance with the resonance curve shown in Fig. 17 is brought about. Thus it is only necessary to dimension the circuit of these additional coils 73, 74 only for the small currents sufficient to bring about the above result. Moreover this division of the auxiliary coils has the very great advantage that the electrical controlling means of the two circuits is entirely separate.

Of course, also in this case it is possible to place in this second auxiliary circuit instead of key 66, an interrupter for producing musical tones or a microphone for transmitting speech, as referred to in aforesaid U. S. Patent 1,181,556, and in particular in case of a microphone the separation of the two magnetizing circuits is of great advantage in case the tone is produced by means of an alternating current.

This division of the auxiliary magnetizing circuits as described, has the further advantage that in case of a large station, very conveniently, means for producing Morse signals by means of a key, means for producing tones and means for telephoning may be arranged side by side so that either of these means for transmitting signals may be used as desired without making further changes in the station. This is shown in Fig. 11. From this figure it will be noted that coils 18, 19 of the set C, are connected with a direct current source 21 by means of a selective switch G, so that the magnetizing circuits of any of the three sets may be energized. In circuit with this direct current source is placed a resistance 69 in shunt with which is located a key 66 and also an interrupter 79 with a key 78 for producing tones. On the other hand, the magnetizing coils 73, 74, are connected with a second direct current source 75 to which microphones 84, 85, 86 are connected in parallel. If it is now desired to radiate telegraph signals, direct current source 21 is connected to the coils 18, 19, and the current in this auxiliary circuit is controlled by means of resistance 77 so that the desired saturation of the cores of the mono-inductive resistances is obtained. Now if resistance 69 is thrown into and out of circuit by operating key 66 the desired signals are produced by alternately tuning and de-tuning the alternating current circuits, as has also been described heretofore. Now, if at the same time, the load circuit 59 is closed, signals may be given by means of key 66$^a$, while the load of the primary generator remains constant.

This is desirable in case large amounts of energy are used, while, for instance in case of small amounts of energy, where the maintenance of a constant load is not so important, signals may be given by means of keys 66, 58 without using the circuit 59. Besides, alone for the sake of reliable operation of a station it is advisable to have both key arrangements. If it is desired to produce musical tone signals key 78 is operated instead of key 66, whereby interrupter 79 is alternately thrown into and out of circuit. Of course, instead of the interrupter an alternating current of low frequency (tone frequency) may be used which then should be superimposed upon the magnetizing direct current. This illustration has been omitted since it is clearly shown and described in our aforesaid U. S. Patent 1,181,556, Fig. 3. Besides, this modification is obvious to any one skilled in the art.

If, on the other hand, it is desired to telephone, the resistance 77 controlling the current through coils 18, 19 is adjusted to a suitable value and then the microphones 84, 85, 86 connected to coils 73, 74 are used.

In this case the microphones are placed in parallel to the primary winding of transformer 83 and thus in parallel with the windings 73, 74. In order to maintain the entire current of the two branches (the coils 73, 74 and the microphone 76) furnished by battery 75, constant, a loading resistance is placed between the branches and battery 75. In this case this resistance consists of the three branches 87, 88, 89. These resistances are preferably at the same time of such character, that they act as choking coils to prevent the current oscillations produced by coils 73, 74 from reaching battery 75. Moreover, in the circuit containing coils 73, 74, condensers 90, 91, 92 are placed which together with the choking coils have the effect that the microphone alternating current in the two branches is separated from the direct current.

The arrangement of the microphones in parallel has the great advantage that, when the current is properly distributed by means of the resistance variations of the microphone, great variations in current intensity are produced in the alternating current windings of the changers. The principal feature is that the resistance variations of the microphone circuit and the auxiliary magnetizing circuit are chosen so that the variations in current intensity caused by the action of the microphone, always cause the intensity variations of the high frequency currents within the range of the value $y$ in Fig. 13.

It may be stated that if it is desired to subject the high frequency current directly to the actions of the microphone an arrangement may be chosen such as is shown in Fig. 19. In this figure, the microphone 76 is arranged in the secondary circuit of the last frequency changer so that the current supplied by this changer is uniformly distributed over the microphone and the antenna 2. Also in this case, the maximum relative variations of the high frequency current are obtained.

It is advisable to arrange between the microphone and the circuit to be directly influenced, an additional current transformer 83 as is shown in Fig. 11, for the purpose of increasing the current in coils 73, 74.

In the arrangements having a microphone described hereinbefore, this device effects a proportional variation between the vibrations produced by the speech and the currents in the auxiliary magnetizing coils 73, 74. Since in turn, these latter currents have relay action upon the secondary currents, upon the frequency changers, and thus upon the antenna current within the limits of resonance, the total effect is obtained that through comparatively small intensity variations produced by the microphone, large energy variations of the radiating energy are obtained, resulting in a clearness and distinctness of the transmitted speech not obtained heretofore.

We claim:

1. In a radio transmission station having an alternating current generator, a plurality of frequency changers for step by step increasing the generator frequency, an antenna supplied with high frequency energy by said changers and key controlled means operative in the antenna for de-tuning it relatively to the frequency impressed upon it by said changers, and a resistance in one of said changer circuits having a second key controlled means in shunt, whereby for producing a signal the antenna is brought into resonance with the frequency produced in same and the resistance is short circuited, while for interrupting the signal the resistance is first thrown into circuit and then the antenna de-tuned.

2. In a radio transmission station, the combination with stationary frequency changers and an antenna suitably connected therewith, of a non-radiating loading circuit suitably permanently connected with said changers, and means for alternately tuning and de-tuning said antenna and said loading circuit, for producing signals substantially as described.

3. In a radio transmission station, the combination with stationary frequency changers and an antenna suitably connected therewith, of a non-radiating loading circuit suitably permanently connected with said changers, and mono-inductive resistances having alternating current and magnetizing coils, and having their alternating current coils located in the antenna and in said loading circuit, and means for controlling the auxiliary magnetizing of said resistances to cause alternately the tuning and de-tuning of said two circuits to thereby control the character of the signals radiated by said antenna.

4. A radio transmission station having an alternating current generator, a plurality of frequency changer sets having secondary windings and having auxiliary magnetizing circuits for step by step increasing the generator frequency, an antenna supplied with high frequency energy by said changers and being connected to one of the secondary windings of the last changer set, a non-radiating load circuit connected to the second secondary winding of said last set and means in the auxiliary magnetizing circuit of this last set for alternately tuning and de-tuning the two secondary circuits for producing signals to be radiated by said antenna.

5. In a radio transmission station, the combination of stationary frequency changers having alternating current coils and auxiliary magnetizing coils, and an antenna suitably connected with said changers, said magnetizing coils having two windings and separate energizing circuits therefor, one of said windings adapted to cause a permanent magnetization of suitable degree, the other winding having means for producing signals in circuit with it for controlling the high frequency energy transmitted to said antenna through said alternating current coils.

6. In a radio transmission station, the combination of stationary frequency changers having alternating current coils and auxiliary magnetizing coils, and an antenna suitably connected with said changers, said magnetizing coils having two windings and separate energizing circuits therefor, one of said windings adapted to cause a permanent magnetization of suitable degree, the other winding having a microphone suitably connected with it for causing a variation of current intensity in said other winding according to the signals transmitted by said microphone for controlling in accordance therewith the high frequency energy transmitted to said antenna through said alternating current coils.

7. In a radio transmission station having an alternating current generator, a plurality of sets of frequency changers for step by step increasing the generator frequency, said changer sets having primary and secondary alternating current windings and also having auxiliary magnetizing coils, an antenna to which the high frequency energy is supplied from said changers, said antenna being connected to the secondary windings of one of said changer sets, said auxiliary magnetizing coils of the changers consisting each of two windings located in separate exciting circuits, means for producing signals and musical tones and means for transmitting speech, said signal and tone producing means being located in one of said exciting circuits and the speech producing means being located in the other of said exciting circuits.

8. In a radio transmission station having frequency changers for step by step increasing the frequency of the current supplied to it and having auxiliary magnetizing windings, an antenna connected to said frequency changers for receiving the high frequency energy from them, a microphone system comprising a plurality of microphones connected to the auxiliary magnetizing windings of said frequency changers and means between said magnetizing windings and the microphones for separating the direct current exciting the microphones from the microphone alternating current to be superimposed upon the auxiliary magnetizing windings.

9. In a radio transmission station having frequency changers for step by step increasing the frequency of the current supplied to it and having auxiliary magnetizing windings, an antenna connected to said frequency changers for receiving the high frequency energy from them, a microphone system comprising a plurality of microphones connected to the auxiliary magnetizing windings of said frequency changers and means between said magnetizing windings and the microphones for separating the direct current exciting the microphones from the microphone alternating current to be superimposed upon the auxiliary magnetizing windings, and a load resistance connected in circuit with the microphones for maintaining the direct current exciting the microphones constant.

10. In a radio transmission station having frequency changers for step by step increasing the frequency of the current supplied to it and having auxiliary magnetizing windings, an antenna connected to said frequency changers for receiving the high frequency energy from them, a microphone system consisting of a plurality of groups of microphones arranged in parallel and being connected to the auxiliary magnetizing windings of said frequency changers and means for each microphone group between these groups and the auxiliary magnetizing windings for separating the exciting microphone direct current from the microphone alternating currents and load resistances arranged in circuit with and adjacent to each microphone group for maintaining the exciting microphone direct current constant.

11. In a radio transmission station having frequency changers for step by step increasing the frequency of the current supplied to it and having auxiliary magnetizing windings, an antenna connected to said frequency changers for receiving the high frequency energy from them, a microphone system comprising a plurality of microphones connected to the auxiliary magnetizing windings of said frequency changers and means between said magnetizing windings and the microphones for separating the direct current exciting the microphones from the microphone alternating current to be superimposed upon the auxiliary magnetizing windings, and load resistances connected in circuit with the microphone for maintaining the direct current exciting the microphone system constant and a current transformer located between the microphone system and the auxiliary magnetizing windings.

12. In a radio transmission station having a primary alternating current generator, a plurality of sets of frequency changers for step by step increasing the generator frequency, said changers having primary and secondary windings and auxiliary magnetizing coils, an antenna to which the high frequency energy is supplied by said changers and which is connected to the secondary windings of the last changer set, the auxiliary magnetizing coils of said last set consisting of two windings with separate circuits, one of said circuits effecting the permanent saturation of the changer coils, a microphone system connected to the other circuit and means between said microphone system and the auxiliary magnetizing windings of said circuit for separating the direct current from the alternating current and a current transformer located between said microphone system and the auxiliary magnetizing windings of said circuit.

GEORG VON ARCO.
ALEXANDER MEISSNER.

Witnesses:
HENRY HASPER,
WOLDEMAR HAUPT.